United States Patent [19]
Whiteside

[11] Patent Number: 4,883,254
[45] Date of Patent: Nov. 28, 1989

[54] FLUSH VALVE HANDLE ASSEMBLY

[75] Inventor: John F. Whiteside, Franklin Park, Ill.

[73] Assignee: Sloan Valve Company, Franklin Park, Ill.

[21] Appl. No.: 328,326

[22] Filed: Mar. 24, 1989

[51] Int. Cl.$^4$ .......................................... F16K 31/145
[52] U.S. Cl. .................................... 251/335.2; 251/40; 74/102
[58] Field of Search ..................... 251/40, 335.2, 335.3, 251/62, 86; 74/543, 519, 102

[56] References Cited

U.S. PATENT DOCUMENTS

| | | | |
|---|---|---|---|
| 2,738,946 | 3/1956 | Filliung | 251/40 X |
| 2,869,570 | 1/1959 | Wilkerson | 251/86 X |
| 4,157,808 | 6/1979 | Eidsmore | 251/335.2 |
| 4,261,545 | 4/1981 | Cillen | 251/40 |

FOREIGN PATENT DOCUMENTS

| | | | |
|---|---|---|---|
| 560640 | 7/1958 | Canada | 251/335.2 |
| 2434228 | 1/1976 | Fed. Rep. of Germany | 251/335.2 |

Primary Examiner—Alan Cohan
Attorney, Agent, or Firm—Kinzer, Plyer, Dorn, McEachran & Jambor

[57] ABSTRACT

A flush valve handle assembly includes a collar adapted to be attached to a flush valve body. There is an opening in the collar and a flush valve handle extends through the opening. A piston is movable within the collar and in contact with that portion of the flush valve handle extending through the opening. An operating rod is attached to and movable with the piston and is integral with a flexible diaphragm which is in sealing contact with the flush valve body. A spring member is attached to the piston and is effective to urge the operating rod and piston to a normally unoperated position.

12 Claims, 1 Drawing Sheet

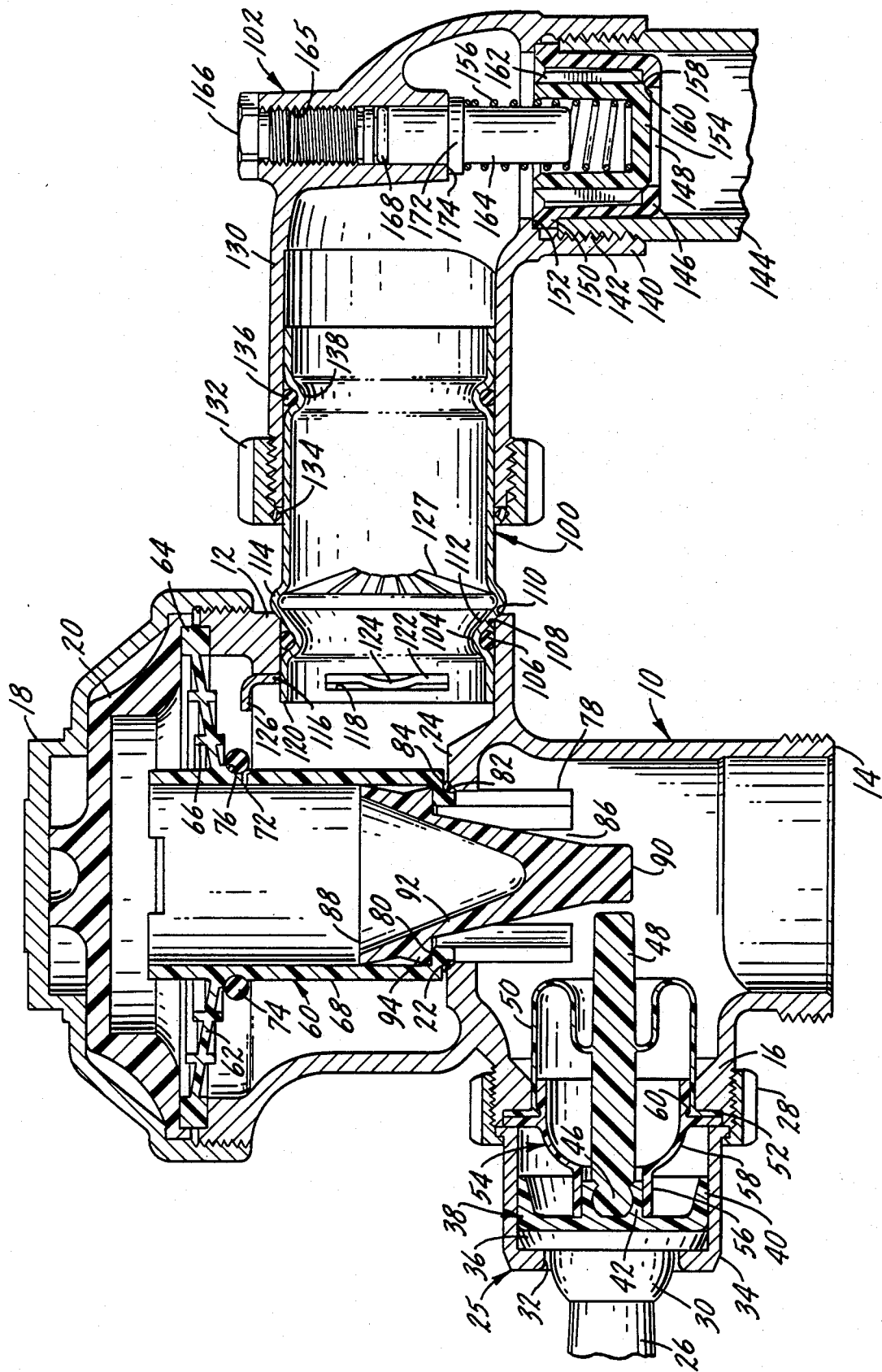

FLUSH VALVE HANDLE ASSEMBLY

SUMMARY OF THE INVENTION

The present invention relates to handle assemblies for use in flush valves, or flushometers, as they are currently termed. The handle assembly is particularly useful with flush valves of the type manufactured by Sloan Valve Company, assignee of the present application, and sold under the trademark ROYAL.

A primary purpose of the present invention is a flush valve handle assembly for the use described which is simplified in construction and assembly and uses a minimum number of easily manufactured parts.

Another purpose is a flush valve handle assembly which has a positive seal with the flush valve body, eliminating any possible leakage about the handle assembly.

Another purpose of the invention is an operator assembly for use on plumbing products such as flush valves, faucets and the like which utilizes a solid plastic spring and a rod integral with a flexible diaphragm, which diaphragm forms a seal with the plumbing fixture body to prevent leakage around the operator assembly.

Other purposes will appear in the ensuing specification, drawing and claims.

BRIEF DESCRIPTION OF THE DRAWING

The invention is illustrated diagrammatically in the attached drawing which is an axial section through a flush valve assembly.

DESCRIPTION OF THE PREFERRED EMBODIMENT

In the drawing, the flush valve has a generally hollow body 10, which includes an inlet opening 12, an outlet connection 14, and a handle coupling connection 16. The flush valve is illustrated in detail in copending application Ser. No. 242,549, filed Sept. 12, 1988 and assigned to the assignee of the present application. The top of the flush valve body is closed by an outer cover 18 and an inner cover 20. The inlet portion of the valve is separated from the outlet portion by a valve seat 22 formed at the termination of an inwardly extending annular body flange 24.

The valve is actuated by a handle assembly 25 which is fastened to the valve body 10 by means of a coupling nut 28. The handle assembly includes a handle 26 having a rounded portion 30 positioned within an opening 32 in a handle cover or collar 34. Handle 26 has a flat actuating portion 36 which is positioned directly adjacent to a piston 38 movable within the handle cover. Piston 38 has a peripheral wall 40 which bears against the interior wall of handle cover 34. It has a central socket 42 which receives the ball-like end 46 of a rod or actuator 48, thereby attaching piston 38 and rod 48.

Rod 48, which may be formed of a suitable flexible plastic material, is integral with a diaphragm 50, which is flexible in both the longitudinal and radial planes of the rod. The diaphragm has sufficient flexure to accommodate longitudinal and arcuate movement of rod 48 during operation of the flush valve. Diaphragm 50 has an outer flange 52 which is attached between the flush valve housing and the handle cover 34, thus sealing the handle assembly to the flush valve body. The diaphragm is also clamped against a flexible plastic spring 54. Spring 54 has a cylindrical portion 56 which surrounds socket 42 of piston 38 and has an arcuate portion 58 which has an exterior groove 60 to receive a mating projection on diaphragm 50. Thus, the diaphragm and its integral rod 48 are clamped to spring 54 and are moved toward a flush valve operating position by force applied to piston 38 from the flush valve actuating handle 26.

Positioned within the flush valve body 10 is a diaphragm assembly indicated generally at 60 which includes an annular flexible diaphragm 62, having an enlarged portion 64 at its periphery which is held between inner cover 20 and an annular shoulder on the flush valve body. Diaphragm 62 may have one or more reinforcing rings 66 positioned intermediate the central area of the diaphragm and the enlarged portion 64. The reinforcing rings may extend axially from both sides of diaphragm 62.

Integral with diaphragm 62 and a part of the diaphragm assembly 60 is a barrel 68. There is a bypass orifice 72 in the wall of barrel 68 directly adjacent diaphragm 62 and a seal ring 74 extends about the barrel in a groove 76, with the seal ring in part masking the bypass orifice, but permitting the passage of water therethrough.

Barrel 68 has a portion 78 of reduced diameter. On the inside of the barrel there is a relief valve seat 80 formed at the top of the portion of reduced diameter 78. On the exterior of the barrel there is a small groove 82 which contains a seal ring 84 which closes upon valve body seat 22 when the flush valve is in the closed position of the drawing. The barrel may have a plurality of axially extending flow control slots 86, if desired.

Positioned within barrel 68 is a relief valve 88 which has a stem portion 90 positioned for contact by actuating rod 48. The enlarged body 92 of the relief valve has an outwardly extending support lip 94 which has a lower surface thereof positioned upon barrel relief valve seat 80 when the flush valve is in the closed position of the drawing. Further details of the relief valve and its operation are described in the abovementioned copending application.

A tubular tailpiece 100 is connected to flush valve inlet 12 on one side and is connected to a check stop 102 at the other end. The tubular tailpiece includes an inwardly directed annular curved recess 104 within which is positioned a seal ring 106. The seal ring is sealingly engaged with both the tubular tailpiece and the inner wall 108 of flush valve inlet 12. Flush valve inlet 12 has an arcuate seating surface 110 which bears against the slanted wall 112 of the tubular tailpiece. The slanted wall joins the inwardly extending annular recess with an outwardly extending annular projection 114 which limits the extent to which the tubular tailpiece can be inserted into the flush valve.

In order to secure the tubular tailpiece within the flush valve, there is a retainer clip 116 which is generally U-shaped in construction and extends through slots 118 in the inner end 120 of the tubular tailpiece. Retainer 116 has a pair of legs 122, each of which has a bowed or arcuate section 124, and the retainer has an inwardly directed end 126 which is positioned within the flush valve when the tubular tailpiece is installed.

A flexible diaphragm 127 is positioned within tailpiece 100 within the annular groove formed by projection 114. The diaphragm functions as a flow restriction in that it will limit the volume of water passing to the flush valve.

The opposite end of the tubular tailpiece is connected to a cylindrical extension 130 of check stop 102 by means of a coupling nut 132. The connection includes a grip ring 134 which is positioned between an end of the coupling nut and an end of tubular extension 130. When the nut is threaded onto extension 130, it compresses ring 134, which then bites into the exterior of the tubular tailpiece. A seal ring 136 is positioned within a recess 138 of the tubular tailpiece and forms a seal between the tailpiece and the tubular extension 130 of the check stop.

The check stop is in the shape of an elbow and has an inlet connection 140 with interior threads 142 to mount an inlet pipe 144. A sleeve 146 having a central opening 148 has its outwardly extending annular flange 150 mounted between the inner end of pipe 144 and seat 152 of the check stop housing. Mounted for reciprocal movement within sleeve 146 is a finned poppet 154 which is normally biased to the closed position shown in the drawing by an internal spring 156. Poppet 154 has an end seat 158 which is seated against a slanted annular surface 160 on the inwardly extending flange of insert 146. There are outwardly extending guide fins 162 on the poppet and when the poppet is moved away from inlet opening 148 by water pressure, water flows around the check stop and toward the flush valve inlet.

An adjustable screw 164 is mounted in a threaded bore 165 in check stop housing 102. Removal of stud 166 provides access to the adjustment screw. Adjustment screw 164 extends within coil spring 156 and has a seal ring 168 to prevent leakage outwardly through the bore 165. There is an outwardly extending flange 172 on the adjusting screw which, in the fully open position of the drawing, is seated against an annular shoulder 174 formed as a part of the check stop housing 102.

In the operation of the check stop, when adjustment screw 164 is in the position shown, water pressure applied at the end of poppet 154 will cause the poppet to raise up away from its seat against the force of spring 156, permitting water to flow into the flush valve housing. Any back siphonage of water is prevented, as poppet 154 will immediately close opening 148 if the pressure within the check stop is greater than that in the inlet line. If the check stop is to be closed or is to severely throttle incoming water, the adjustment screw is turned after removal of stud 166 so as to compress coil spring 156, increasing the pressure required to open the check stop. Adjusting screw 164 is limited in its outward movement by flange 172 and can be moved downward a distance to totally shut off flow through the check stop.

Incoming water, after it has passed the check stop, will flow into the flush valve and will normally seep through bypass orifice 72 into the upper chamber above the relief valve. Since the surface area subjected to inlet water pressure is greater on the upper side of the diaphragm than on the lower side, water pressure holds the diaphragm on seat 22 and water pressure also holds the relief valve on barrel relief valve seat 80. When a user pivots handle 26 in any direction, it will cause inward movement of piston 38, which in turn will move rod 48 into contact with the relief valve, causing the relief valve to tilt. When the piston and its attached rod move in this manner, diaphragm 50 will flex in a longitudinal plane. The curved surface 58 of plastic spring 54 will distort. Inward movement of piston 38 is limited by the compression and distortion of the plastic spring and by contact between the exterior flange 40 of the piston and the outwardly extending flange of plastic spring 54.

Inward movement, as described, of rod 48 tilts the relief valve which has the effect of unseating the relief valve from barrel seat 80 and, at least in part, moving annular sealing lip 94 away from the interior surface of barrel 68. This relieves the pressure in the upper chamber of the flush valve and causes the diaphragm assembly, consisting of the diaphragm, barrel and relief valve, to raise up, thereby creating a direct connection between inlet 12 and outlet 14.

When the diaphragm assembly so moves, relief valve 88 will again close on relief valve seat 80, closing off the upper chamber. Water seeping through orifice 72 will, in time, cause the diaphragm assembly to return to the closed position of the drawing. This provides a measured volume of water for flushing a toilet or urinal.

Even if handle 26 should be held in an operable position, the diaphragm assembly will still close upon body valve seat 80. The holding open of the handle assembly will maintain the position of piston 48 beneath the stem 90 of the relief valve, but there is sufficient radial flexure in diaphragm 50 such that the relief valve can return to its normal seated position.

When handle 26 is released, plastic spring 54 will return piston 38 to its normal open position, carrying push rod 48 with it.

The flush valve handle assembly is particularly desirable, as it is simple in construction and uses only a few easily molded plastic parts. The seal for the handle is provided by diaphragm 50 which is in firm sealing engagement with the flush valve housing. There is no possibility of water leakage at the handle. Use of a plastic spring is highly desirable and provides a handle assembly of extremely long life. Because diaphragm 50 is flexible in both longitudinal and radial planes, it provides for non hold-open operation of the flush valve. The relief valve will always return to its normally seated position even though handle 26 is held in an open position.

Whereas the preferred form of the invention has been shown and described herein, it should be realized that there may be many modifications, substitutions and alterations thereto.

The embodiments of the invention in which an exclusive property or privilege is claimed are defined as follows:

1. An operator assembly for use in operating a plumbing fixture such as a flush valve, including a collar adapted to be attached to a flush valve body, an opening in said collar, an operator having a portion extending through said collar opening, a piston movable within said collar and having a surface thereof in contact with that portion of the operator which extends through said opening, a rod attached to said piston and formed and adapted to operate the flush valve, a diaphragm attached to said rod at a location remote from said piston, said diaphragm being movable with said rod and in sealing contact with the flush valve body, spring means urging said piston and rod to an unoperated position outwardly of the flush valve body, movement of said operator causing movement of said piston, rod and diaphragm inwardly toward the flush valve to cause operation thereof.

2. The operator assembly of claim 1 wherein said rod and diaphragm are integral and are formed of a material having sufficient flexure so that said diaphragm flexes in a longitudinal direction with movement of said rod.

3. The operator assembly of claim 2 wherein said diaphragm flexes in a plane radial to said rod during movement of the rod to operate a flush valve.

4. The operator assembly of claim 1 wherein said diaphragm has an outwardly extending flange secured between facing surfaces of the flush valve body and the collar.

5. The operator assembly of claim 1 wherein said piston has a central socket and said rod has a ball secured within said socket.

6. The operator assembly of claim 1 further characterized in that said piston has an exterior wall in sliding contact with the interior of said collar.

7. The operator assembly of claim 1 wherein said spring means is a solid flexible member having opposite ends thereof in contact with said diaphragm and piston.

8. The operator assembly of claim 7 wherein said diaphragm has an outwardly extending flange, said spring means having an outwardly extending flange, with the flanges of said spring means and diaphragm being fixed between said collar and the flush valve body.

9. The operator assembly of claim 7 wherein said spring means has an axially extending sleeve portion positioned about a cylindrical portion of said piston.

10. A handle assembly for use in operating a flush valve, including a collar adapted to be attached to a flush valve body, an opening in said collar and a flush valve handle having a portion extending through said collar opening, a piston movable within said collar and having a surface thereof in contact with that portion of the handle which extends through the collar opening, a rod attached to said piston and formed and adapted to operate a flush valve, a diaphragm integral with said rod and in sealing contact with the flush valve body, said diaphragm being flexible in planes radial to and longitudinal of said rod, a solid flexible spring member having opposite ends thereof secured to said piston and said diaphragm, said spring member urging said piston and rod outwardly of the flush valve body, movement of said handle causing movement of said piston to move said rod and the flexible diaphragm, with the rod moving to a flush valve operating position.

11. The handle assembly of claim 10 further characterized in that said spring member and said diaphragm each have outwardly-extending flanges, which flanges are in contact with each other and with the collar and flush valve body, whereby the diaphragm and spring are secured to the flush valve body.

12. An operator assembly for use in operating a plumbing fixture, including a collar adapted to be attached to a plumbing fixture, an opening in said collar, an operator having a portion extending through said collar opening, a piston movable within said collar and having a surface thereof in contact with that portion of the operator which extends through said opening, an actuator attached to said piston and formed and adapted to operate a plumbing fixture, a diaphragm integral with said actuator and in sealing contact with the plumbing fixture, a solid flexible spring member having opposite ends thereof secured to said piston and said diaphragm, said spring member moving said piston and actuator toward an unopened position, movement of said operator causing movement of said piston, actuator and diaphragm toward a position to operate the plumbing fixture.

* * * * *